US011241738B2

(12) United States Patent
Lee et al.

(10) Patent No.: US 11,241,738 B2
(45) Date of Patent: Feb. 8, 2022

(54) METAL POWDER MANUFACTURING APPARATUS FOR METAL 3D PRINTER

(71) Applicant: KOREA INSTITUTE OF SCIENCE AND TECHNOLOGY, Seoul (KR)

(72) Inventors: Yong Bok Lee, Seoul (KR); Jungwan Kim, Seoul (KR); Sena Jeong, Seoul (KR); Bok Seong Choe, Seoul (KR); Wonil Kwak, Seoul (KR); Jaeseung Byun, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 375 days.

(21) Appl. No.: 16/421,687

(22) Filed: May 24, 2019

(65) Prior Publication Data

US 2019/0375021 A1 Dec. 12, 2019

(30) Foreign Application Priority Data

Jun. 12, 2018 (KR) .................. 10-2018-0067430

(51) Int. Cl.
  *B22F 9/10* (2006.01)
  *B22F 9/08* (2006.01)
  (Continued)

(52) U.S. Cl.
  CPC . *B22F 9/10* (2013.01); *B01J 2/12* (2013.01); *B22F 2009/084* (2013.01);
  (Continued)

(58) Field of Classification Search
  CPC .................. B22F 9/10; B22F 9/14; B01J 2/12
  See application file for complete search history.

(56) References Cited

U.S. PATENT DOCUMENTS

| 4,964,791 A | 10/1990 | Sakuno et al. |
| 5,855,642 A | 1/1999 | Miller et al. |

(Continued)

FOREIGN PATENT DOCUMENTS

| CN | 101327519 A | * 12/2008 |
| EP | 1 072 807 A2 | 1/2001 |

(Continued)

OTHER PUBLICATIONS

Machine translation of CN 101327519 A to Zhang Jianli provided by patents.google.com (Year: 2008).*

(Continued)

*Primary Examiner* — Joseph S Del Sole
*Assistant Examiner* — John Robitaille
(74) *Attorney, Agent, or Firm* — Rabin & Berdo, P.C.

(57) ABSTRACT

A metal powder manufacturing apparatus for a metal 3-dimensional (3D) printer includes a driving unit which generates a rotational force, a metal beam connected to the driving unit to receive the rotational force from the driving unit and having one end disposed in a vacuum chamber, and a shaft support which supports an outer circumference of the metal beam using a magnetic force for relative movement of the metal beam in a lengthwise direction of the metal beam, wherein the shaft support is disposed such that an inner side is spaced apart a predetermined distance from the outer circumference of the metal beam, and can support the metal beam at an adjusted relative distance from the metal beam.

10 Claims, 9 Drawing Sheets

(51) Int. Cl.
  *B33Y 10/00* (2015.01)
  *B33Y 30/00* (2015.01)
  *B01J 2/12* (2006.01)
(52) U.S. Cl.
  CPC ........... *B22F 2999/00* (2013.01); *B33Y 10/00* (2014.12); *B33Y 30/00* (2014.12)

(56) References Cited

U.S. PATENT DOCUMENTS

| 6,835,227 | B2 | 12/2004 | Lian et al. |
| 7,547,346 | B2 | 6/2009 | Sekine |
| 2004/0075355 | A1 | 4/2004 | Ries et al. |

FOREIGN PATENT DOCUMENTS

| JP | 61-201920 A | 9/1986 |
| JP | 02-152545 A | 6/1990 |
| JP | 02-258905 A | 10/1990 |
| JP | 03-009147 A | 1/1991 |
| JP | 11-026424 A | 1/1999 |
| JP | 2001-041238 A | 2/2001 |
| JP | 2002-088407 A | 3/2002 |
| JP | 2008-208432 A | 9/2008 |
| KR | 10-1994-0001982 A | 2/1994 |
| KR | 10-0237155 B1 | 1/2000 |
| KR | 10-0264394 B1 | 8/2000 |
| KR | 10-2014-0027335 A | 3/2014 |
| WO | WO 2012/148714 A1 | 11/2012 |

OTHER PUBLICATIONS

T. Mohanty et al., "Arc plasma assisted Rotating Electrode Process for preparation of metal pebbles", XXVI Int. Symp. on Discharges and Electrical Insulation in Vacuum, 2014, pp. 741-744.
Dakshinamoorthy Sathiyamoorthy et al., "Beryllium Pebbles Preparation and Modeling of Rotating Electrode Process", Fusion Science and Technology, Feb. 2012, pp. 159-166, vol. 61.

\* cited by examiner

METAL POWDER MANUFACTURING APPARATUS FOR METAL 3D PRINTER

CROSS-REFERENCE TO RELATED APPLICATION

This application claims priority to Korean Patent Application No. 10-2018-0067430, filed on Jun. 12, 2018, and all the benefits accruing therefrom under 35 U.S.C. § 119, the contents of which in its entirety are herein incorporated by reference.

STATEMENT REGARDING SPONSORED RESEARCH

This research is made with support for follow-up research funding (Strategic research area position) (Development of reliability improved ball bearing for extreme environment and smart ball bearing core technology, No. 1711084586) of National Research Foundation, Ministry of Science and ICT in Republic of Korea, under the supervision of Korean Institute of Science and Technology.

BACKGROUND

1. Field

The present disclosure relates to a metal powder manufacturing apparatus for a metal 3-dimensional (3D) printer.

2. Description of the Related Art 3-dimensional (3D) printers that allow anybody to manufacture products from model are said to be 'Fourth Industrial Revolution' and 'Internet revolution in the manufacturing industry, and they are gaining global attention. In this circumstance, there is a pessimistic view on 3D printer technology using metal due to its limitations in terms of equipment and material costs and mass production.

A metal 3D printer using metal is largely classified into a Powder Bed Fusion (PBF) process and a Directed Energy Deposition (DED) process.

The PBF process is a process that applies a few tens of μm of metal powder layer to a powder bed having a predetermined area from a powder supply device, and melts layer by layer using selective irradiation of a laser or electron beam as a shaped light source according to design model so that metal powder is joined together and added layer by layer. The DED process is a process that supplies metal powder in real time in a protective gas atmosphere, and melts and deposits metal powder using a high-output laser immediately upon supply. The PBF process is relatively precise and advantageous to achieve a degree of freedom of shape.

Metal powder for 3D printers uses PBF process and spherical shape, and is manufactured through atomization by various methods. The typical metal powder manufacturing method for 3D printers includes Plasma Rotating Electrode Process (PREP), Plasma atomization (PA) and Gas Atomization (GA). Among them, PREP such as Patent Literature 1 has high precision, high homogeneity and high yield advantages.

However, PREP needs to maintain high speed rotation, and it is required that the rotating shaft maintains stability during high speed rotation, and the titanium rod needs replacement when its length becomes smaller, resulting in low productivity.

SUMMARY

The present disclosure is directed to providing a metal powder manufacturing apparatus for a metal 3-dimensional (3D) printer that allows safe operation with the increased movement area of a metal rod and the improved rotational speed of a rotating shaft.

The present disclosure is further directed to providing a metal powder manufacturing apparatus for a metal 3D printer in which a predetermined distance between the metal rod and a plasma torch is maintained.

A metal powder manufacturing apparatus for a metal 3D printer according to the present disclosure includes a driving unit which generates a rotational force, a metal beam connected to the driving unit to receive the rotational force from the driving unit and having one end disposed in a vacuum chamber, and a shaft support which supports an outer circumference of the metal beam using a magnetic force for relative movement of the metal beam in a lengthwise direction of the metal beam, wherein the shaft support is disposed such that an inner side is spaced apart a predetermined distance from the outer circumference of the metal beam, and can support the metal beam at an adjusted relative distance from the metal beam.

The shaft support may include a housing which forms an external shape and has a receiving portion formed at an inner side, a core installed in the receiving portion such that the core is disposed on the outer circumference of the metal beam and having a plurality of poles projected along a circumferential direction, and a coil wound on the poles to form an electromagnetic force in the poles by application of an electric current.

One end of the pole may be spaced apart from the outer circumference of the metal beam.

The driving unit may have a driving shaft which rotates by the generated rotational force and is connected to an end of the metal beam, and the metal powder manufacturing apparatus for a metal 3D printer according to the present disclosure may further include a flexible connecting element connecting an end of the driving shaft and an end of the metal beam to reduce eccentricity between the driving shaft and the metal beam.

The shaft support may be fixedly installed at a bottom near the vacuum chamber.

The metal powder manufacturing apparatus for a metal 3D printer according to the present disclosure may further include a linear stage which feeds to move the driving unit.

The metal powder manufacturing apparatus for a metal 3D printer according to the present disclosure may further include a linear stage which feeds to move the driving unit, and a control unit electrically connected to the shaft support and the linear stage to control an intensity of the current applied to the coil and a feed distance of the linear stage.

The control unit may adjust stiffness of the shaft support by controlling the intensity of the current applied to the coil based on a distance between the metal beam and the shaft support.

The control unit may calculate a distance of consumption of the metal beam based on a distance between the metal beam and the shaft support and an input current value applied to the coil, and move the linear stage as much as the distance of consumption of the metal beam.

The metal powder manufacturing apparatus for a metal 3D printer according to the present disclosure may further include a backup bearing installed at the inner side of the shaft support, wherein the backup bearing includes a top foil which forms an air gap between the top foil and the metal beam when the metal beam rotates, and a porous foil connected to the top foil and made of a porous elastic material.

The metal beam may be a strong magnetic material.

DETAILED DESCRIPTION

Hereinafter, the disclosed embodiments will be described in detail with reference to the accompanying drawings, and identical or similar elements are given identical or similar reference signs and redundant descriptions are omitted herein. As used herein, the suffix "unit" for elements is only given or used to ease the drafting of the specification, and does not have any meaning or role for identifying itself. Additionally, in describing the embodiments disclosed herein, when a certain detailed description of relevant known technology is determined to render the key subject matter of the disclosed embodiments ambiguous, its detailed description is omitted herein. Additionally, the accompanying drawings are provided for an easy understanding of the disclosed embodiments, and the technical spirit disclosed herein is not limited by the accompanying drawings, and it should be understood that the present disclosure covers all modifications, equivalents or alternatives falling in the spirit and scope of the present disclosure.

The terms "first", "second", and the like may be used to describe various elements, but the elements are not limited by the terms. Rather, the terms are used to distinguish one element from another.

It will be further understood that when an element is referred to as being "connected to" another element, it can be directly connected to the other element or intervening elements may be present.

As used herein, the singular forms are intended to include the plural forms as well, unless the context clearly indicates otherwise.

It will be understood that the term "comprises" or "includes" when used in this specification, specifies the presence of stated features, integers, steps, operations, elements, components or groups thereof, but does not preclude the presence or addition of one or more other features, integers, steps, operations, elements, components, or groups thereof.

Figure 1:
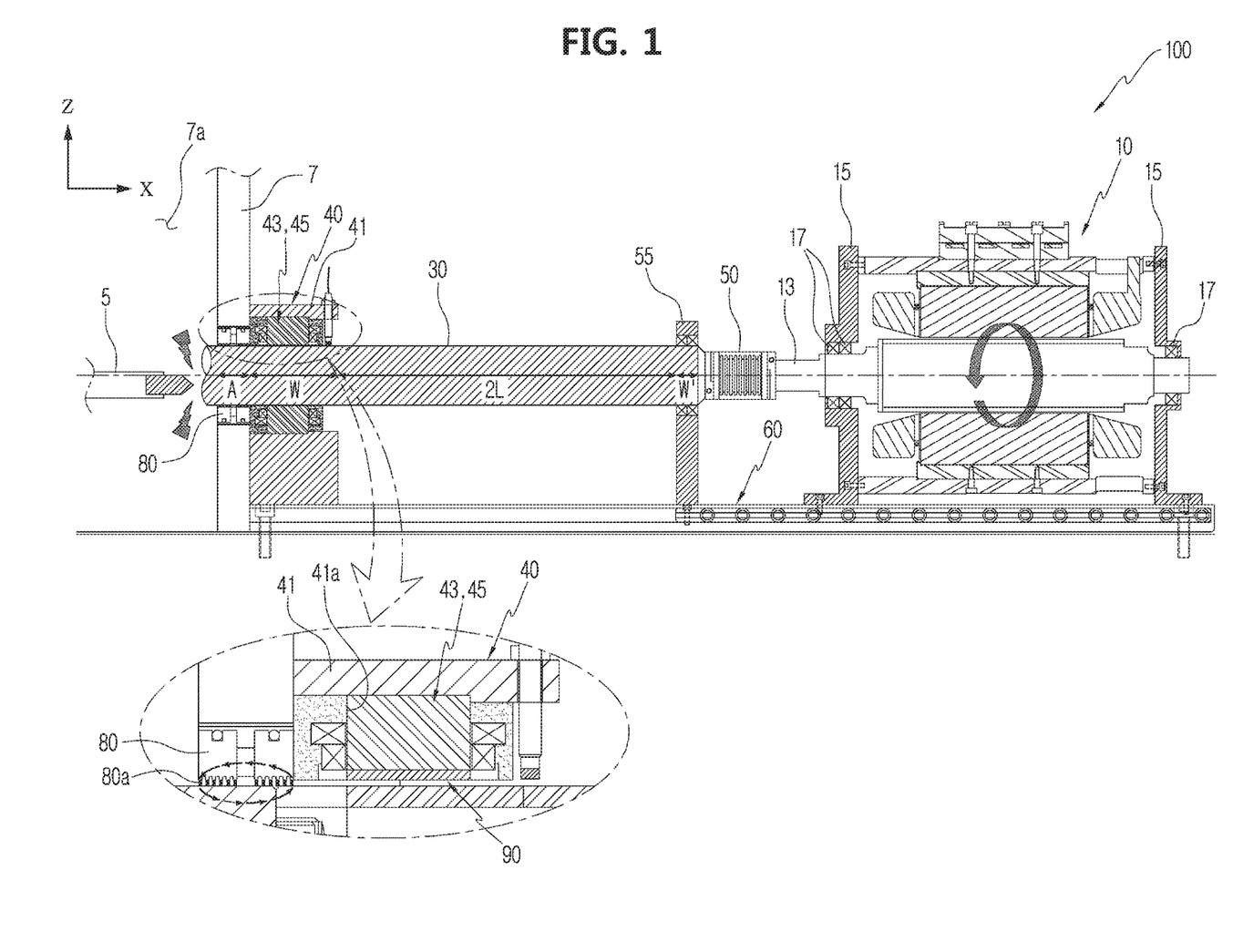
FIG. 1 is a cross-sectional view of an example of a metal powder manufacturing apparatus for a metal 3-dimensional (3D) printer according to the present disclosure.
Figure 2:
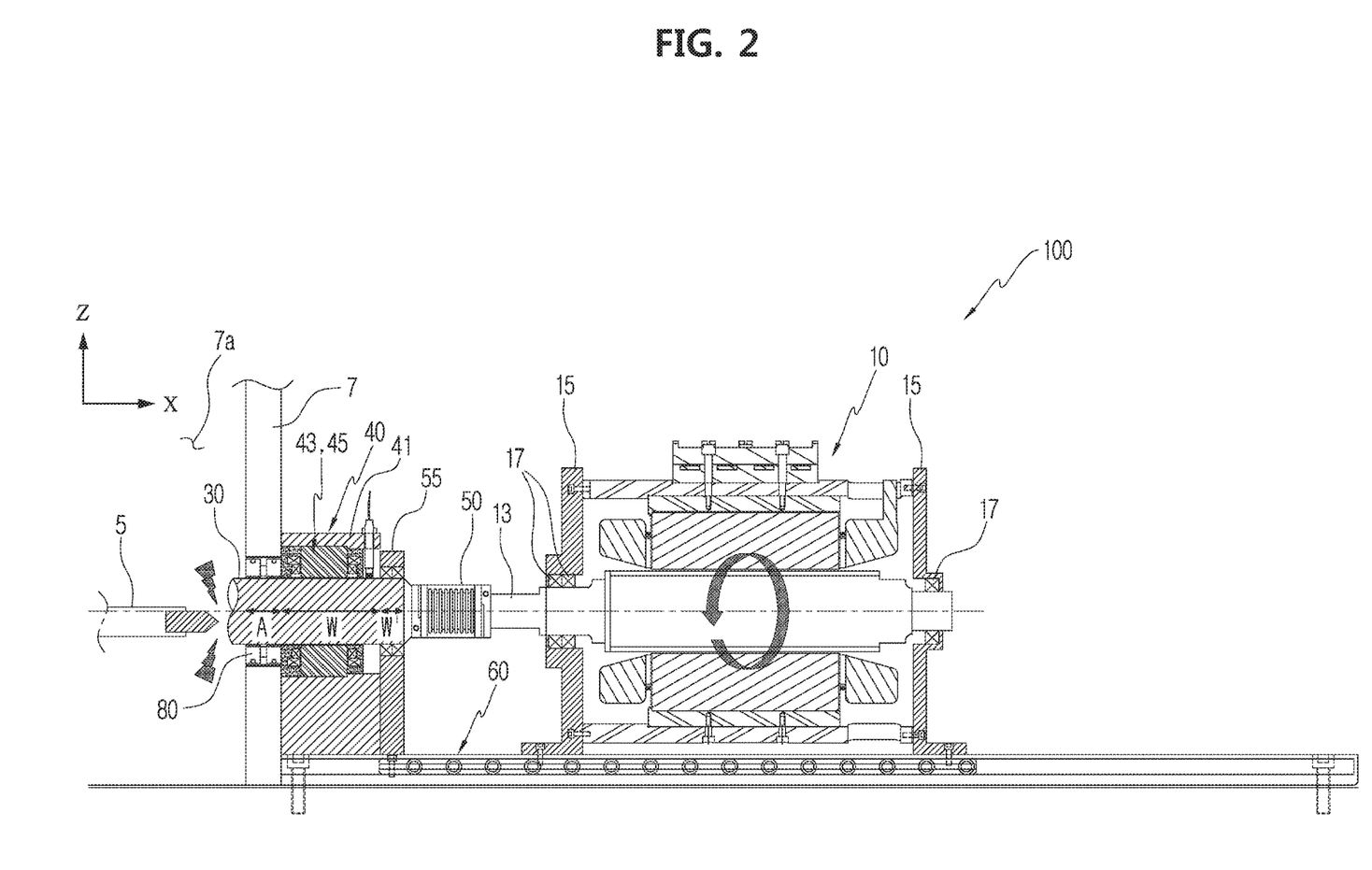
FIG. 2 is a cross-sectional view of the metal powder manufacturing apparatus for a metal 3D printer of FIG. 1.
Figure 3A:
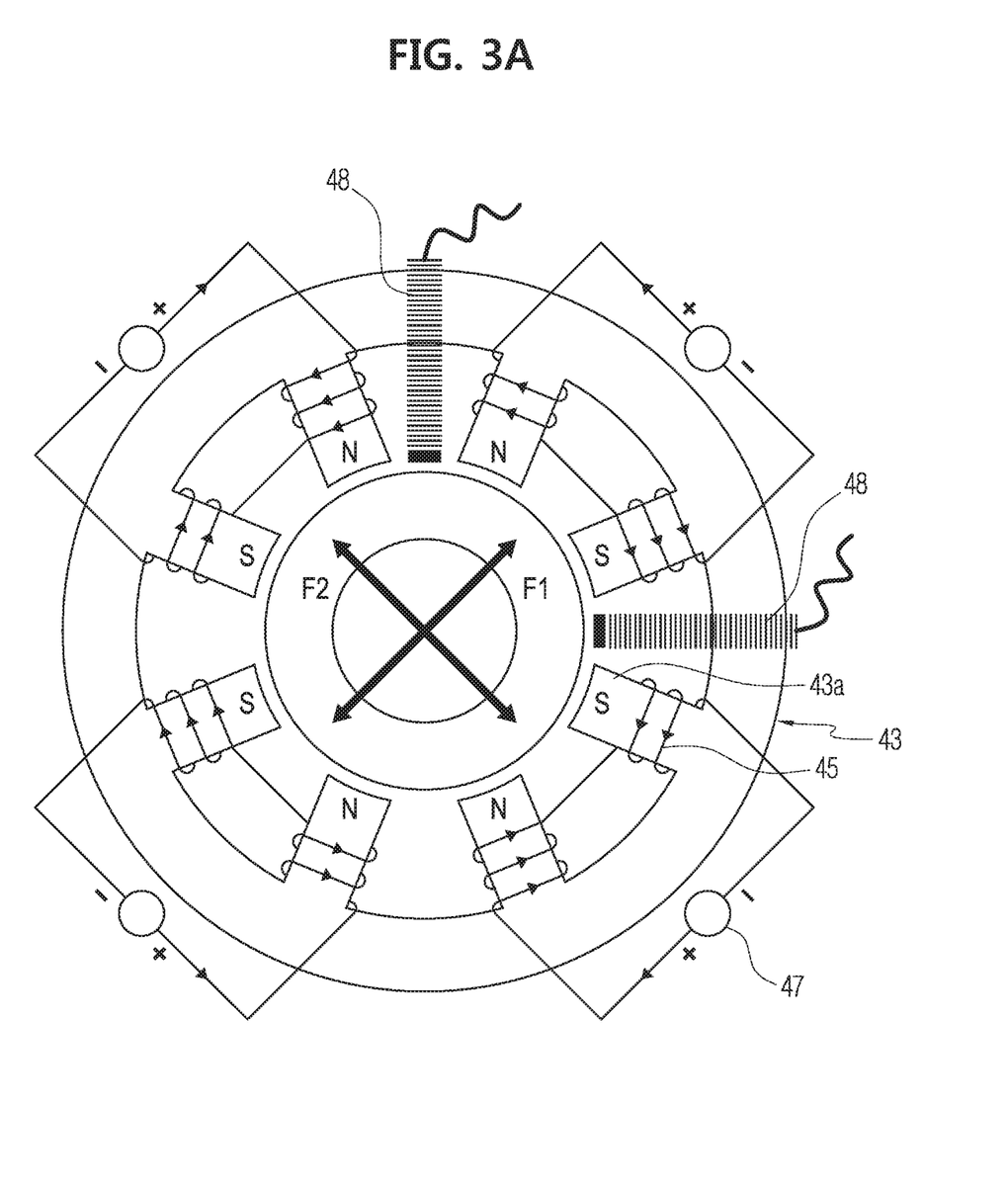
FIG. 3A is a front view showing a core and a coil of FIG. 1.
Figure 3B:
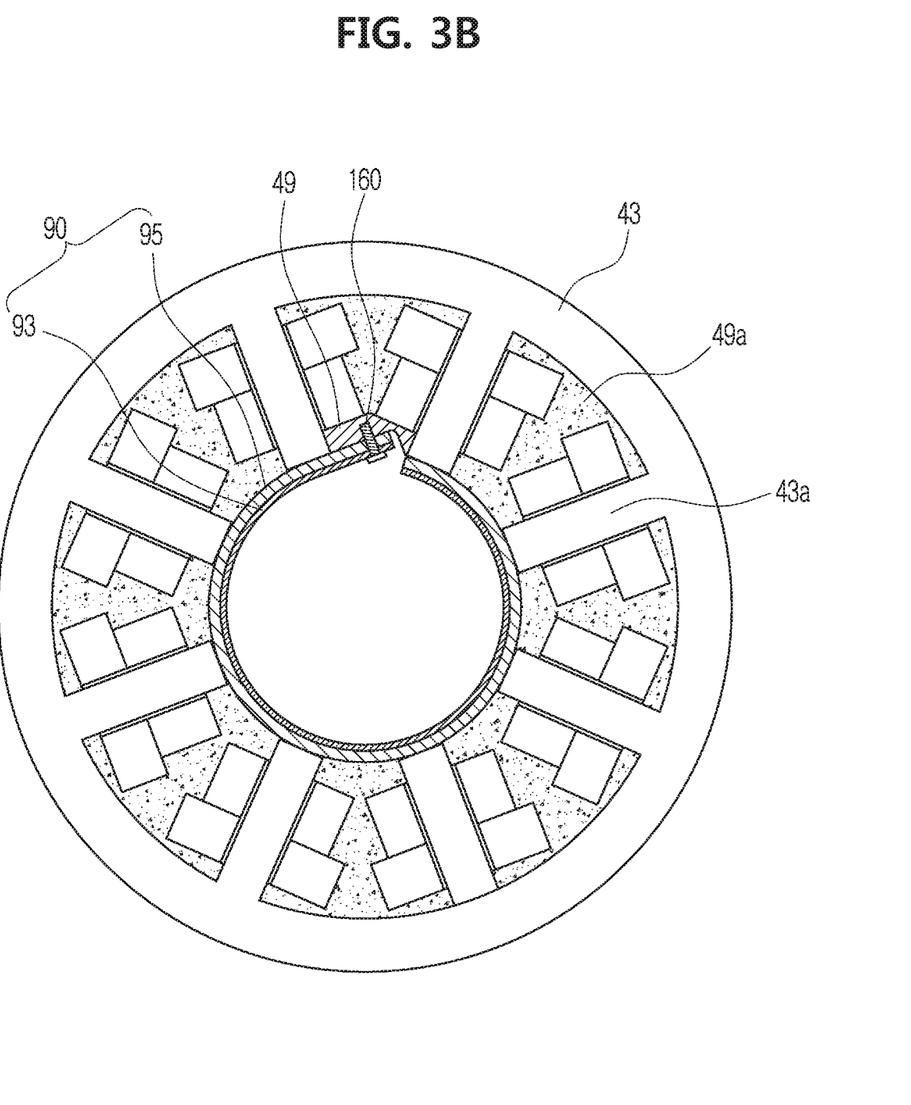
FIG. 3B is a front view showing an example of installation of a backup bearing in FIG. 3A.
Figure 6:
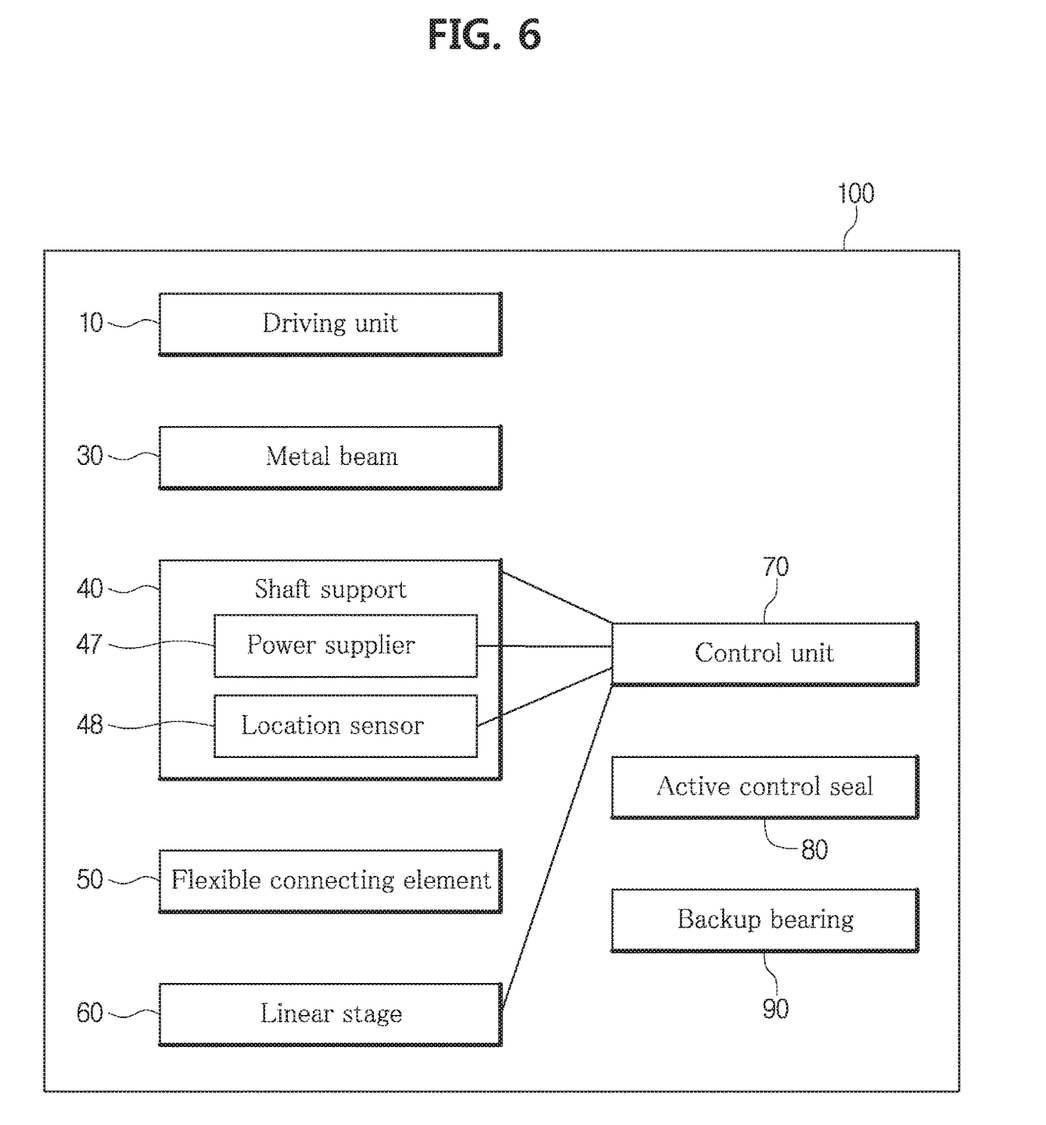
FIG. 6 is a block diagram of a metal powder manufacturing apparatus for a metal 3D printer according to the present disclosure.

FIGS. 1 and 2 are cross-sectional views of an example of a metal powder manufacturing apparatus 100 for a metal 3-dimensional (3D) printer according to the present disclosure, and FIG. 3A is a front view showing a core 43 and a coil 45 of FIG. 1. FIG. 3B is a front view showing an example of installation of a backup bearing 90 in FIG. 3A. Additionally, FIG. 6 is a block diagram of the metal powder manufacturing apparatus 100 for a metal 3D printer according to the present disclosure.

Hereinafter, the structure of the metal powder manufacturing apparatus 100 for a metal 3D printer according to the present disclosure is described with reference to FIGS. 1 to 3B and FIG. 6.

The metal powder manufacturing apparatus 100 for a metal 3D printer according to the present disclosure may be understood as Hybrid Foil Magnetic Bearing (HFMB) or a structure including HFMB.

The metal powder manufacturing apparatus 100 for a metal 3D printer according to the present disclosure includes a driving unit 10, a metal beam 30 and a shaft support 40.

The driving unit 10 generates a rotational force. Additionally, the driving unit 10 may have a driving shaft 13 connected to the end of the metal beam 30. The driving shaft 13 is rotated by the rotational force generated by the driving unit 10. Although not shown in the drawings, the driving unit 10 may be connected to a power source and supplied with power, and accordingly, the driving unit 10 can rotate. Additionally, the driving unit 10 may move in the lengthwise direction of the driving shaft 13 by a linear stage 60 as described below. Meanwhile, a support end 15 may be installed at two ends of the driving unit 10, and a ball bearing 17 disposed around the driving shaft 13 may be installed at the inner side of the support end 15 to rotatably support the driving shaft 13. Accordingly, the driving shaft 13 can withstand high speed rotation.

The metal beam 30 is connected to the driving shaft 13 to receive the rotational force from the driving unit 10, and can rotate by the rotational force received from the driving unit 10. Additionally, the metal beam 30 has one end disposed in a vacuum chamber 7, and is melted by a plasma torch 5 in a high temperature environment to form metal powder.

For example, as shown in FIG. 1, the metal beam 30 may be connected to the driving shaft 13 of the driving unit 10, and can be replaced when the length is reduced by powder formation or for maintenance/repair. In this case, for example, the metal beam 30 may be a non-magnetic titanium rod, but is not necessarily limited thereto.

According to an embodiment of the example shown in FIG. 1, the metal beam 30 may be made of a strong magnetic material. For example, the strong magnetic material may be 12 Cr Steel.

Referring to FIGS. 1 and 2, the metal beam 30 may be eccentric to the plasma torch 5 for uniform melting and spray in the side direction of the metal beam 30 by rotation of the driving unit 10, yielding metal powder.

Meanwhile, in the present disclosure, the vacuum chamber 7 has a vacuum area 7a inside, and high precision and high uniformity metal powder may be obtained from the metal beam 30 at the vacuum area 7a. For example, the vacuum chamber 7 may be fixed to the bottom or a fixedly disposed fixture.

The shaft support 40 supports the outer circumference of the metal beam 30 using a magnetic force, and allows for the relative movement of the metal beam 30 in the lengthwise direction of the metal beam 30. To this end, the inner circumference of the shaft support 40 is spaced apart from the outer circumference of the metal beam 30. The shaft support 40 is configured to generate a magnetic force at the inner side, and can support the metal beam 30 while not contacting the metal beam 30 by the magnetic force, so friction does not occur between.

As shown in FIG. 1, the total length of the metal beam 30 used in the metal powder manufacturing apparatus 100 for a metal 3D printer according to the present disclosure may be A+W+2L+W', and in this instance, because two ends of the metal beam 30 are supported by the bearing (the shaft support 40 and a self-aligning bearing), the structure is stable and there is no contact between the metal beam 30 and the shaft support 40, and thus the full 2L length will be sprayed through the plasma torch via feeding.

In contrast, in the case of the structure using ball bearings according to the related art, the metal beam and the ball bearings at two ends move together in contact with each other, and thus the maximum production length is L and the minimum required length L' (Ball bearing~self-aligning) should be always equal to or larger than L, and in such a system, powder that can be produced to the maximum extent is L. If L of the front part is longer than L of the rear part, an overhanging structure results and it is very unstable and unsuitable for high speed rotation, and accordingly, L' should be larger than L.

As shown in the enlarged view of FIG. 1, the shaft support 40 supports the metal beam 30, spaced apart from the metal beam 30, and thus when moving in the lengthwise direction, the metal beam 30 may move while being supported. Meanwhile, the shaft support 40 may be actively controlled by a control unit 70 as described below to change the bearing stiffness or damping, thereby supporting the metal beam 30 more easily in a high speed rotation environment.

For example, the shaft support 40 may be fixed to a fixedly disposed fixture or the bottom near the vacuum chamber 7, allowing for the relative movement of the metal beam 30 in the lengthwise direction of the metal beam 30. FIG. 1 shows an example in which the shaft support 40 is fixed to the right side of the outer wall of the vacuum chamber 7 and the bottom.

In the present disclosure, the shaft support 40 may be, for example, a magnetic bearing.

The shaft support 40 may include a housing 41, a core 43 and a coil 45.

The housing 41 forms the external shape of the shaft support 40, and has a receiving portion 41a formed at the inner side where the core 43 can be installed.

The core 43 is installed at the receiving portion 41a such that the core 43 is disposed on the outer circumference of the metal beam 30. Additionally, the core 43 has a pole 43a, and a plurality of poles 43a is projected along the circumferential direction at the inner side of the core 43. FIG. 3a shows an example in which eight projected poles 43a are formed along the circumferential direction at the inner side of the core 43, and each pole 43a may become magnetized to N or S by the coil 45 as described below to support the metal beam 30 by the magnetism.

The core 43 may be a thin plate, and the plurality of cores 43 may be arranged in the receiving portion of the housing 41. For example, the core 43 may be formed of a silicon steel plate, but is not necessarily limited thereto. Although not clearly shown in FIGS. 3A and 3B, the plurality of cores 43 is arranged along the lengthwise direction of the metal beam 30 between the outer circumference the metal beam 30 and the receiving portion 41a of the housing 41.

The coil 45 may be wound on the pole 43a, and for example, each of a plurality of coils 45 is wound on two adjacent poles 43a, and when an electric current from a power supplier 47 is applied to each coil 45, a magnetic force is generated.

The shaft support 40 may further include a location sensor 48 to measure the distance between the metal beam 30 and the inner side of the shaft support 40. For example, the location sensor 48 may measure the distance between the outer circumference of the metal beam 30 and the end of the pole 43a.

The metal powder manufacturing apparatus 100 for a metal 3D printer according to the present disclosure may further include an active control seal 80 installed air-tightly at the wall of the vacuum chamber 7 to allow the metal beam 30 to move into and out of the vacuum chamber 7. The active control seal 80 is not in direct close contact with the outer circumference of the metal beam 30 to create a vacuum environment in the vacuum chamber 7 while maintaining a noncontact environment. The active control seal 80 may be, for example, a magnetic fluid seal formed using a magnetic fluid. The active control seal 80 of the present disclosure is such that a magnetic fluid disposed at the wall of the vacuum chamber 7 forms a liquid ring by the magnetic flux to provide a seal. For example, the magnetic fluid may be a fluid in colloidal state after magnetic microparticles of about 10 nm undertake specialized surface treatment and are mixed with a liquid. The enlarged diagram of FIG. 1 shows an example in which the magnetic fluid 80a is formed by the active control seal 80 along the direction of the arrow. Accordingly, a vacuum environment is created in the vacuum chamber 7 while maintaining a noncontact environment.

The metal powder manufacturing apparatus 100 for a metal 3D printer according to the present disclosure may further include a flexible connecting element 50. The flexible connecting element 50 connects the end of the driving shaft 13 and the end of the metal beam 30, and rectifies even a small concentricity deviation between the driving shaft and the rotating shaft, thereby achieving smooth rotation. Accordingly, it is possible to reduce a center mismatch between the driving shaft 13 and the metal beam 30 and prevent the imbalance that may occur when the rotational speed goes beyond a predetermined speed, thereby improving the rotation stability.

Additionally, a self-aligning bearing 55 may be further installed at the metal beam 30 near the flexible connecting element 50. As the self-aligning bearing 55 is installed at the metal beam 30, the metal beam 30 can rotate while maintaining concentricity to the maximum extent, thereby further reducing the imbalance between the driving shaft 13 and the metal beam 30 and further improving the rotation stability. FIGS. 1 and 2 show an example in which the self-aligning bearing 55 is installed such that the self-aligning bearing 55 can move by a linear stage 60 as described below.

The metal powder manufacturing apparatus 100 for a metal 3D printer according to the present disclosure may further include a linear stage 60. As shown in FIGS. 1 and 2, the linear stage 60 may support up the driving unit 10 and the self-aligning bearing 55, and move the driving unit 10 in the lengthwise direction of the metal beam 30 to move the metal beam 30 in the lengthwise direction. Additionally, the linear stage 60 may delicately tune movements to adjust the concentricity of the metal beam 30 at the inner side of the shaft support 40. For example, the linear stage 60 may include a linear motion (LM) guide.

The metal powder manufacturing apparatus 100 for a metal 3D printer according to the present disclosure may further include a control unit 70. As shown in the block diagram of FIG. 6, the control unit 70 may be electrically connected to the shaft support 40 and the linear stage 60 to control the intensity of the current applied to the coil 45 of the shaft support 40 and the feed distance of the driving unit 10. For example, the control unit 70 may be connected to the power supplier 47 and the location sensor 48 of the shaft support 40.

The control unit 70 may control the intensity of the current applied to the coil 45 based on the distance between the metal beam 30 and the shaft support 40. The stiffness or damping of the shaft support 40 may be adjusted by the control of the current intensity. Accordingly, it is possible to achieve high speed rotation while preventing the eccentricity of the metal beam 30 that may occur when the mass of the metal beam 30 reduces as powder is formed. The distance between the metal beam 30 and the shaft support 40 may be, for example, the spacing distance between the outer circumference of the metal beam 30 and the end of the pole 43a of the core 43, and may be the distance between the center of the metal beam 30 and the center of the shaft support 40.

For example, the control of the current intensity may be performed by $f_y = k_i i_y - k_y y$ (hereinafter, "Equation 1"). Here $k_y = \mu_0 * A * N^2 / g_0^3 * i_b^2 (\cos \alpha)$, and $k_i = \mu_0 * A * N^2 / g_0^2 * i_b (\cos \alpha)$, where N may be the number of windings of the coil 45, A may be the area of the pole 43a on which the coil 45 is wound, and $\mu_0$ may be the transmittance. That is, the position stiffness coefficient $k_y$ may be a predetermined constant value of the shaft support 40, and the current stiffness coefficient $k_i$ may be a predetermined constant value of the shaft support 40.

Here, $f_y = mg$, where mg may be the weight of the shaft (the net force of the metal beam 30 supported by the shaft support 40), and the current intensity $i_y$ may be controlled based on the distance y between the metal beam 30 and the shaft support 40.

The control unit 70 may sense a change in current control value $i_y$, and calculate the length of consumption of the metal beam 30.

Additionally, the control unit 70 calculates the length of consumption of the metal beam 30 from the current intensity, and feeds the linear stage 60 as much as the length of consumption of the metal beam 30 to move the driving unit 10. As the driving unit 10 moves, the metal beam 30 connected to the driving shaft 13 of the driving unit 10 moves.

For example, the length of consumption of the metal beam 30 may be calculated by $f_x = k_i i_x - k_s x$ (hereinafter, "Equation 2"). Here, $k_s = \mu_0 * A * N^2 / g_0^3 * i_b^2 (\cos \alpha)$ and $k_i = \mu_0 * A * N^2 / g_0^2 * i_b (\cos \alpha)$ where the position stiffness coefficient $k_s$ may be a predetermined constant value of the shaft support 40, and the current stiffness coefficient $k_i$ may be a predetermined constant value of the shaft support 40. Additionally, $f_x = mg$ (the weight of the metal beam 30) and $mg = (\rho \pi r^2 l) g$. Here, $\rho$ is the density of the metal beam 30, $\pi$ is the ratio of a circle's circumference to its diameter, r is the radius of the metal beam 30, and l is the length of the metal beam 30 and is a predetermined constant value. The length l of consumption of the metal beam 30 may be calculated by inputting a value of the current $i_x$ applied to the shaft support 40 and a value of the distance x between the metal beam 30 and the shaft support 40 into Equation 2.

The control unit 70 feeds the linear stage 60 as much as the length l of consumption of the metal beam 30 to move the driving unit 10, thereby uniformly maintaining the distance between the plasma torch 5 and the metal beam 30.

For example, the control unit 70 may move the linear stage 60 based on the distance between the metal beam 30 and the plasma torch 5. The distance between the metal beam 30 and the plasma torch 5 may be a value sensed by the location sensor 48. For example, when the distance between the end of the metal beam 30 and the plasma torch 5 increases as the metal beam 30 powder is formed, the control unit 70 controls the linear stage 60 to move the driving unit 10 toward the vacuum chamber 7 to allow the metal beam 30 to enter the vacuum chamber 7 further inwards.

Meanwhile, the control unit 70 may control the stiffness and damping of the shaft support 40 according to the rotational speed of the metal beam 30.

Meanwhile, referring to FIG. 3B, the metal powder manufacturing apparatus 100 for a metal 3D printer according to the present disclosure may further include a backup bearing 90 installed at the inner side of the shaft support 40. The backup bearing 90 prevents the interference or damage that may occur between the metal beam 30 and the shaft support 40. For example, when the shaft support 40 cannot support the metal beam 30 due to malfunction or magnetic force reduction, the backup bearing 90 prevents the contact or collision between the metal beam 30 and the shaft support 40.

The backup bearing 90 may be, for example, an airfoil bearing. The backup bearing 90 may include a top foil 93 that forms an air gap between the top foil 93 and the metal beam 30 when the metal beam 30 rotates, and a porous foil 95 made of a porous elastic material. The backup bearing 90 is disposed near the metal beam 30 to back up the metal beam 30, thereby preventing the contact or collision between the metal beam 30 and the shaft support 40. For example, the backup bearing 90 may be connected to a connecting piece 49 of the shaft support 40 by a bolt 160. Additionally, a dielectric 49a is filled between the poles 43a, and the connecting piece 49 is installed in the dielectric 49a.

Hereinafter, the operation process of the present disclosure is described with reference to FIGS. 4 and 5.

Figure 4:
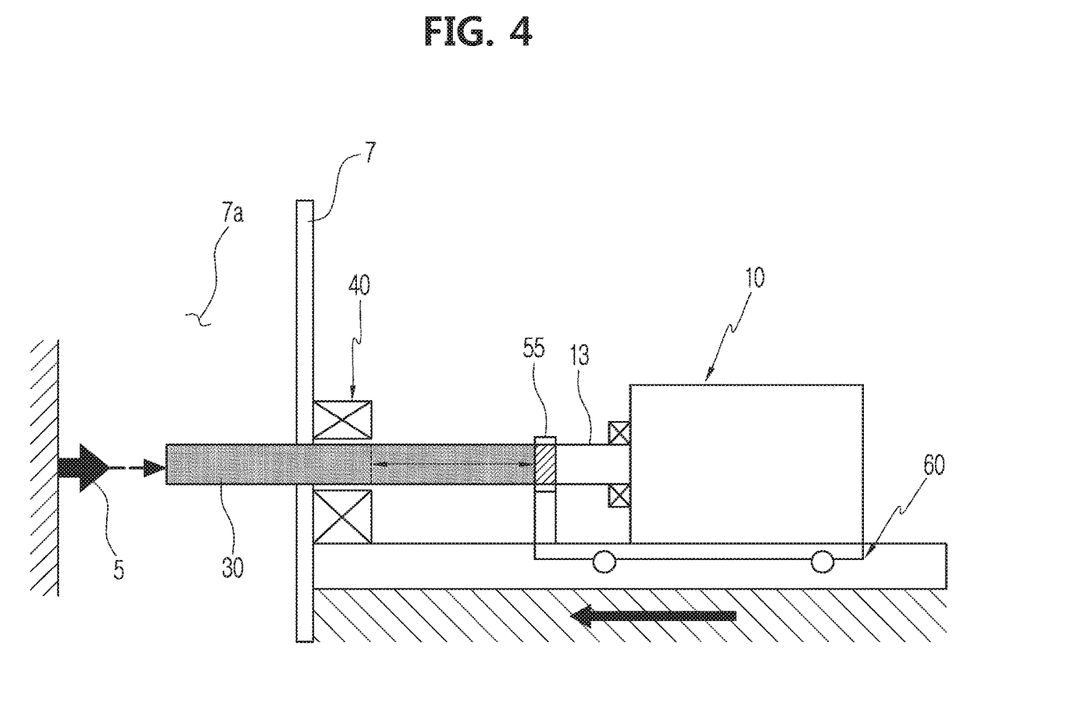
FIG. 4 is a conceptual diagram showing the metal powder manufacturing apparatus for a metal 3D printer of FIG. 1 in initial state.

FIG. 4 shows the metal powder manufacture in the initial step. Referring to FIG. 4, the shaft support 40 is fixedly installed at the wall of the vacuum chamber 7, and the metal beam 30 is installed at the shaft support 40 moveably in the lengthwise direction. The metal beam 30 is connected to the driving unit 10 to receive a driving power, and can rotate. While the plasma torch 5 and the metal beam 30 maintain a predetermined distance, the metal beam 30 rotates at high speed and is melted by high temperature transferred from the plasma torch 5 to form metal powder.

Figure 5:
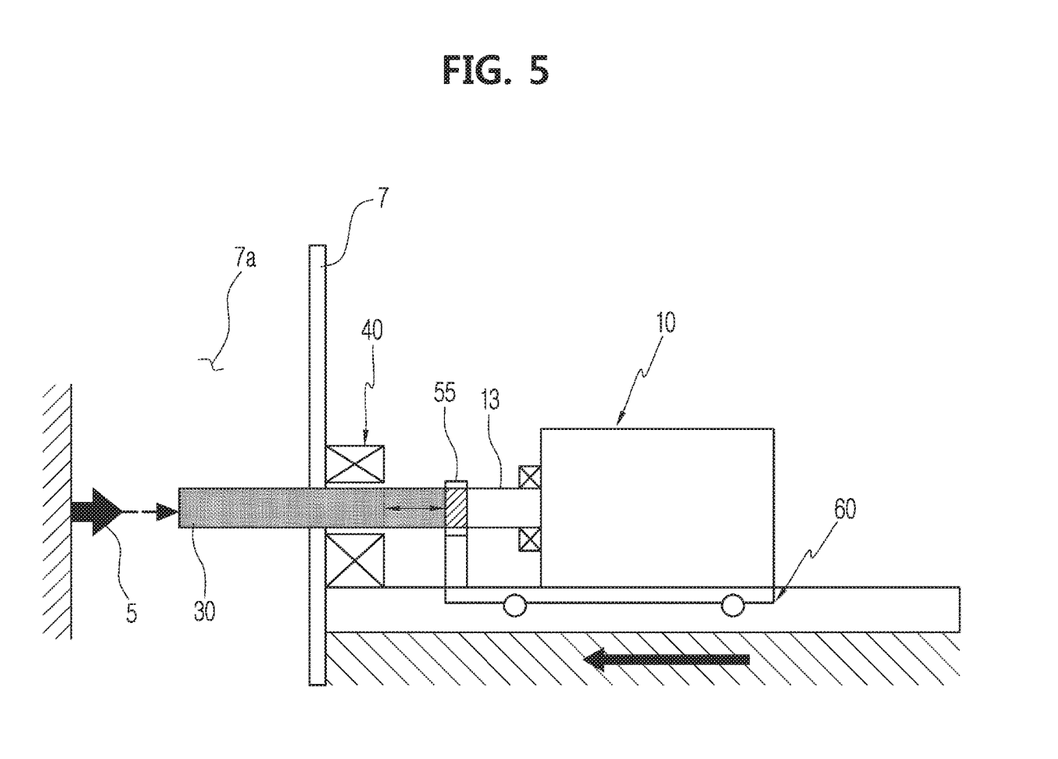
FIG. 5 is a conceptual diagram showing the metal powder manufacturing apparatus for a metal 3D printer of FIG. 1 in final state.

FIG. 5 shows the metal powder manufacture in the final step. In the final step, the metal beam 30 moves left along the lengthwise direction in the shaft support 40 fixed to the wall of the vacuum chamber 7, and the metal beam 30 is supplied with the driving power from the driving unit 10 and rotates at high speed, and then is melted by high temperature transferred from the plasma torch 5, forming metal powder. An example in which the plasma torch 5 and the metal beam 30 are maintained at a predetermined distance is shown in FIG. 5.

Figure 7:
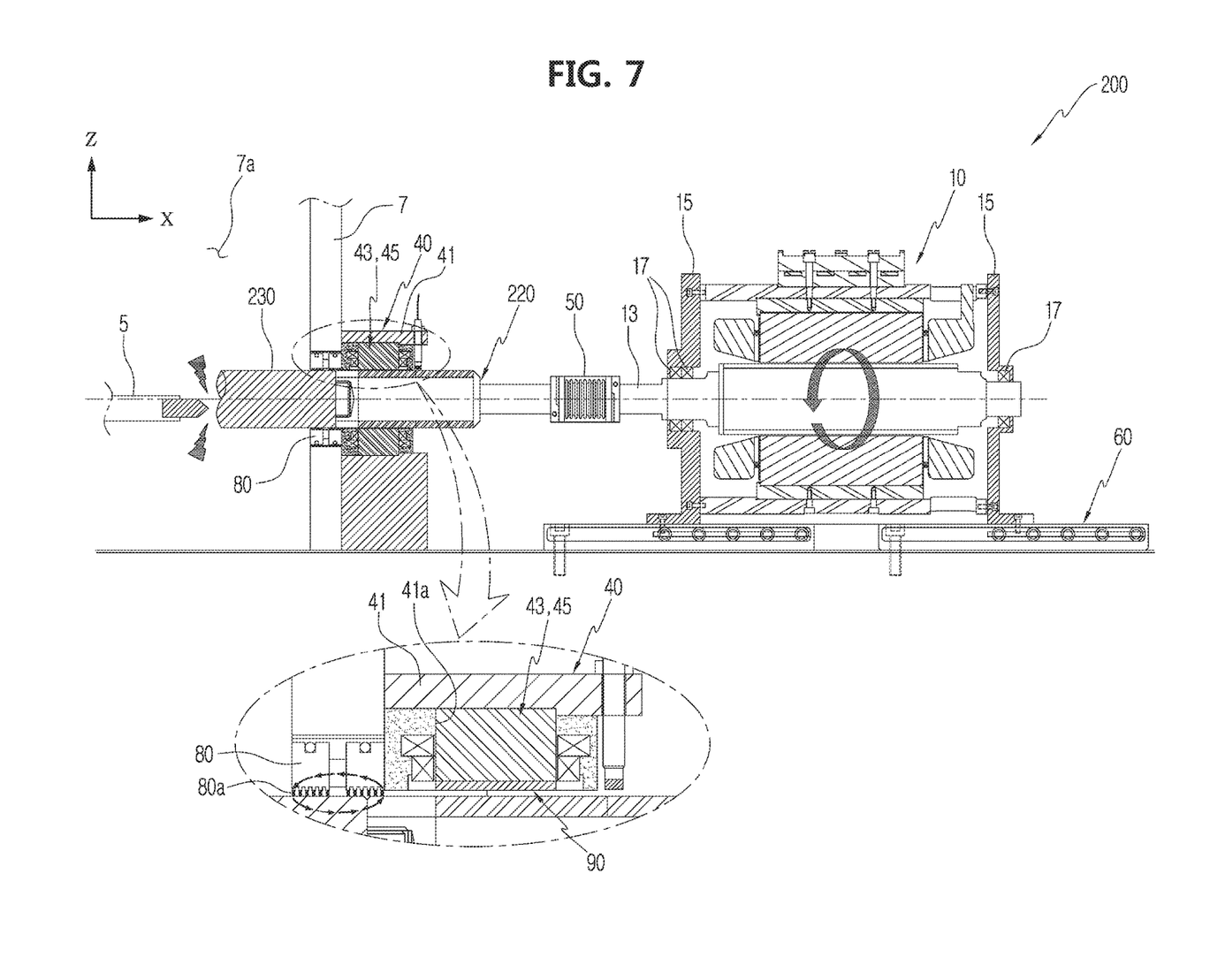
FIG. 7 is a cross-sectional view of another example of a metal powder manufacturing apparatus for a metal 3D printer according to the present disclosure.
Figure 8:
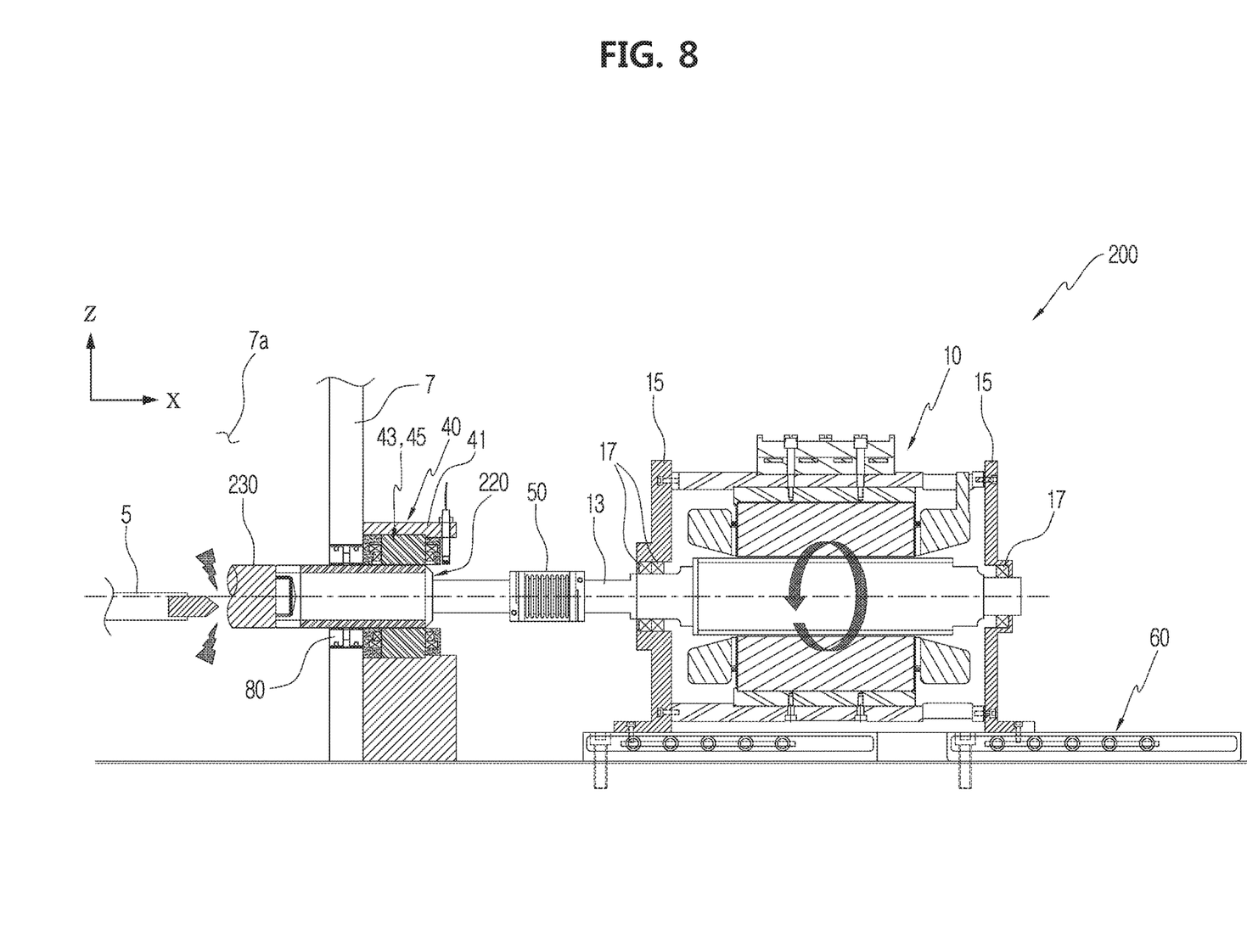
FIG. 8 is a cross-sectional view of the metal powder manufacturing apparatus for a metal 3D printer of FIG. 7.

FIGS. 7 and 8 are cross-sectional views of another example of a metal powder manufacturing apparatus 200 for a metal 3D printer according to the present disclosure.

Hereinafter, the structure of another example of the metal powder manufacturing apparatus 200 for a metal 3D printer according to the present disclosure is described with reference to FIGS. 7 and 8. Additionally, the core 43 and the coil 45 of the metal powder manufacturing apparatus 200 for a metal 3D printer will be described with reference to FIGS. 3B and 3B. Meanwhile, hereinafter, for description not made in another example of the metal powder manufacturing apparatus 200 for a metal 3D printer according to the present disclosure, the description of an example of the metal powder manufacturing apparatus 100 for a metal 3D printer according to the present disclosure can be used instead.

The metal powder manufacturing apparatus 200 for a metal 3D printer according to the present disclosure includes a driving unit 10, a rotating shaft 220, a metal beam 230 and a shaft support 40.

The driving unit 10 generates a rotational force. Additionally, the driving unit 10 may have a driving shaft 13 connected to the end of the rotating shaft 220. The driving shaft 13 is rotated by the rotational force generated by the driving unit 10. Although not shown in the drawings, the driving unit 10 may be connected to a power source and supplied with power, and accordingly, the driving unit 10 can rotate. Additionally, the driving unit 10 may move in the lengthwise direction of the driving shaft 13 by a linear stage 60 as described below. Meanwhile, a support end 15 may be installed at two ends of the driving unit 10, and a ball bearing 17 disposed around the driving shaft 13 may be installed at the inner side of the support end 15 to rotatably support the driving shaft 13. Accordingly, the driving shaft 13 can withstand high speed rotation.

The rotating shaft 220 is connected to the driving unit 10 to receive the generated rotational force from the driving unit 10. When the metal beam 230 as described below is screw connected, the rotating shaft 220 may have a screw connecting portion for receiving the screw at the end of the metal beam 230. The rotating shaft 220 may receive the high speed rotational force from the driving unit 10 to generate a centrifugal force.

The metal beam 230 is connected to one end of the rotating shaft 220 to rotate with the rotating shaft 220. Additionally, the metal beam 230 has one end disposed in the vacuum chamber 7, and is melted by the plasma torch 5 in a high temperature environment to form metal powder.

For example, as shown in FIG. 7, the metal beam 230 may be connected to the rotating shaft 220 by bolting, and can be replaced when the length is reduced by powder formation or for maintenance/repair. In this case, for example, the metal beam 230 may be a non-magnetic titanium rod, but is not necessarily limited thereto.

Referring to FIGS. 7 and 8, the metal beam 230 may be eccentric to the plasma torch 5 for uniform melting and spray in the side direction of the metal beam 230 by rotation of the rotating shaft 220, yielding metal powder.

Meanwhile, in the present disclosure, the vacuum chamber 7 has a vacuum area 7a inside, and high precision and high uniformity metal powder may be obtained from the metal beam 230 at the vacuum area 7a. For example, the vacuum chamber 7 may be fixed to the bottom or a fixedly disposed fixture.

The shaft support 40 supports the outer circumference of the rotating shaft 220 using a magnetic force, and allows for the relative movement of the rotating shaft 220 in the lengthwise direction of the rotating shaft 220. The shaft support 40 is configured to generate a magnetic force at the inner side, and can support the rotating shaft 220 while not contacting the rotating shaft 220 by the magnetic force, so friction does not occur between. As shown in the enlarged view of FIG. 7, the shaft support 40 supports the rotating shaft 220, spaced apart from the rotating shaft 220, and thus when moving in the lengthwise direction, the rotating shaft 220 may move while being supported. Meanwhile, the shaft support 40 may be actively controlled by a control unit as described below to change the bearing stiffness or damping, thereby supporting the rotating shaft 220 more easily in a high speed rotation environment.

For example, the shaft support 40 may be fixed to a fixedly disposed fixture or the bottom near the vacuum chamber 7, allowing for the relative movement of the rotating shaft 220 and the metal beam 230 in the lengthwise direction of the rotating shaft 220. FIG. 7 shows an example in which the shaft support 40 is fixed to the right side of the outer wall of the vacuum chamber 7 and the bottom.

In the present disclosure, the shaft support 40 may be, for example, a magnetic bearing.

The shaft support 40 may include a housing 41, a core 43 and a coil 45.

The housing 41 forms the external shape of the shaft support 40, and has a receiving portion 41a formed at the inner side where the core 43 can be installed.

The core 43 is installed at the receiving portion 41a such that the core 43 is disposed on the outer circumference of the rotating shaft 220. Additionally, the core 43 has a pole 43a, and a plurality of poles 43a is projected along the circumferential direction at the inner side of the core 43. FIG. 3A shows an example in which eight projected poles 43a are formed along the circumferential direction at the inner side of the core 43, and each pole 43a may become magnetized to N or S by the coil 45 as described below to support the rotating shaft 220 by the magnetic force.

The core 43 may be a thin plate, and a plurality of cores 43 may be arranged in the receiving portion of the housing 41. For example, the core 43 may be formed of a silicon steel plate, but is not necessarily limited thereto. Although not clearly shown in FIGS. 3A and 3B, the plurality of cores 43 is arranged along the lengthwise direction of the rotating shaft 220 between the outer circumference of the rotating shaft 220 and the receiving portion 41a of the housing 41.

The coil 45 may be wound on the pole 43a, and for example, each of the plurality of coils 45 is wound on two adjacent poles 43a, and when an electric current from a power supplier 47 is applied to each coil 45, a magnetic force is generated.

The shaft support 40 may further include a location sensor 48 to measure the distance between the rotating shaft 220 and the inner side of the shaft support 40. For example, the location sensor 48 may measure the distance between the outer circumference of the rotating shaft 220 and the end of the pole 43a.

The metal powder manufacturing apparatus 200 for a metal 3D printer according to the present disclosure may further include an active control seal 80 installed air-tightly at the wall of the vacuum chamber 7 to allow the metal beam 230 and the rotating shaft 220 to move into or out of the vacuum chamber 7. The active control seal 80 is not in direct close contact with the outer circumference of the metal beam 230 or the rotating shaft 220 to create a vacuum environment in the vacuum chamber 7 while maintaining a noncontact environment. The active control seal 80 may be, for example, a magnetic fluid seal formed using a magnetic fluid. The active control seal 80 of the present disclosure is such that a magnetic fluid disposed at the wall of the vacuum chamber 7 forms a liquid ring by the magnetic flux to provide a seal. For example, the magnetic fluid may be a fluid in colloidal state after magnetic microparticles of about 10 nm undertake specialized surface treatment and are mixed with a liquid. The enlarged view of FIG. 7 shows an example in which the magnetic fluid 80a is formed by the active control seal 80 along the direction of the arrow. Accordingly, a vacuum environment is created in the vacuum chamber 7 while maintaining a noncontact environment.

The metal powder manufacturing apparatus 200 for a metal 3D printer according to the present disclosure may further include a flexible connecting element 50. The flexible connecting element 50 connects the end of the driving shaft 13 and the end of the rotating shaft 220, and rectifies even a small concentricity deviation between the driving shaft and the rotating shaft, thereby achieving smooth rotation. Accordingly, it is possible to reduce a center mismatch between the driving shaft 13 and the rotating shaft 220 and prevent the imbalance that may occur when the rotational speed goes beyond a predetermined speed, thereby improving the rotation stability.

The metal powder manufacturing apparatus 200 for a metal 3D printer according to the present disclosure may further include a linear stage 60. As shown in FIGS. 7 and 8, the linear stage 60 may support up the driving unit 10, and move the driving unit 10 in the lengthwise direction of the rotating shaft 220 to move the rotating shaft 220 in the lengthwise direction. Additionally, the linear stage 60 may delicately tune movements to adjust the concentricity of the rotating shaft 220 at the inner side of the shaft support 40. For example, the linear stage 60 may include a linear motion (LM) guide.

The metal powder manufacturing apparatus 200 for a metal 3D printer according to the present disclosure may further include a control unit (not shown). The control unit may be electrically connected to the shaft support 40 and the linear stage 60 to control the intensity of the current applied to the coil 45 of the shaft support 40 and the feed distance of the driving unit 10. For example, the control unit may be connected to the power supplier 47 and the location sensor 48 of the shaft support 40.

The control unit may control the intensity of the current applied to the coil 45 based on the distance between the rotating shaft 220 and the shaft support 40. The stiffness or damping of the shaft support 40 may be adjusted by the control of the current intensity. Accordingly, it is possible to achieve high speed rotation while preventing the eccentricity of the rotating shaft 220 that may occur when the mass of the metal beam 230 reduces as powder is formed. The distance between the rotating shaft 220 and the shaft support 40 may be, for example, the spacing distance between the outer circumference of the rotating shaft 220 and the end of the pole 43a of the core 43, and may be the distance between the center of the rotating shaft 220 and the center of the shaft support 40.

For example, the control of the current intensity may be performed by $f_y=k_i i_y-k_y y$ (hereinafter, "Equation 1"). Here $k_y=\mu_0*A*N^2/g_0^3*i_b^2(\cos \alpha)$, and $k_i=\mu_0*A*N^2/g_0^2*i_b(\cos \alpha)$, where N may be the number of windings of the coil 45, A may be the area of the pole 43a on which the coil 45 is wound, and $\mu_0$ may be the transmittance. That is, the position stiffness coefficient $k_y$ may be a predetermined constant value of the shaft support 40, and the current stiffness coefficient $k_i$ may be a predetermined constant value of the shaft support 40.

Here, $f_y=mg$, where mg may be the weight of the shaft (the net force of the metal beam 230 and the rotating shaft 220 supported by the shaft support 40), and the current intensity $i_y$ may be controlled based on the distance y between the rotating shaft 220 and the shaft support 40.

The control unit may sense a change in current control value $i_y$ change and calculate the length of consumption of the metal beam 230.

Additionally, the control unit calculates the length of consumption of the metal beam 230 from the current intensity, and feeds the linear stage 60 as much as the length of consumption of the metal beam 230 to move the driving unit 10. As the driving unit 10 moves, the rotating shaft 220 connected to the driving shaft 13 of the driving unit 10 moves, and the metal beam 230 connected to the end of the rotating shaft 220 moves together.

For example, the length of consumption of the metal beam 230 may be calculated by $f_x=k_i i_x-k_s x$ (hereinafter, "Equation 2"). Here, $k_s=\mu_0*A*N^2/g_0^3*i_b^2(\cos \alpha)$, and $k_i=\mu_0*A*N_2/g_0^2*i_b(\cos \alpha)$, where the position stiffness coefficient $k_s$ may be a predetermined constant value of the shaft support 40, and the current stiffness coefficient $k_i$ may be a predetermined constant value of the shaft support 40. Additionally, $f_x=mg$ (the weight of the metal beam 230), and $mg=(\rho\pi r^2 l)g$. Here, $\rho$ is the density of the metal beam 230, $\pi$ is the ratio of a circle's circumference to its diameter, r is the radius of the metal beam 230, and l is the length of the metal beam 230 and is a predetermined constant value. The length l of consumption of the metal beam 230 may be calculated by inputting a value of the current $i_x$ applied to the shaft support 40 and a value of the distance x between the rotating shaft 220 and the shaft support 40 into Equation 2.

The control unit feeds the linear stage 60 as much as the length l of consumption of the metal beam 230 to move the driving unit 10, thereby uniformly maintaining the distance between the plasma torch 5 and the metal beam 230.

For example, the control unit may move the linear stage 60 based on the distance between the metal beam 230 and the plasma torch 5. The distance between the metal beam 230 and the plasma torch 5 may be a value sensed by the location sensor 48. For example, when the distance between the end of the metal beam 230 and the plasma torch 5 increases as the metal beam 230 powder is formed, the control unit controls the linear stage 60 to move the driving unit 10 toward the vacuum chamber 7 to allow the rotating shaft 220 connected to the metal beam 230 to enter the vacuum chamber 7 further inwards.

Meanwhile, the control unit may control the stiffness and damping of the shaft support 40 according to the rotational speed of the rotating shaft 220.

Meanwhile, referring to FIG. 3B, the metal powder manufacturing apparatus 200 for a metal 3D printer according to the present disclosure may further include a backup bearing 90 installed at the inner side of the shaft support 40. The backup bearing 90 prevents the interference or damage that may occur between the rotating shaft 220 and the shaft support 40. For example, when the shaft support 40 cannot support the rotating shaft 220 due to malfunction or magnetic force reduction, the backup bearing 90 prevents the contact or collision between the rotating shaft 220 and the shaft support 40.

The backup bearing 90 may be, for example, an airfoil bearing. The backup bearing 90 may include a top foil 93 that forms an air gap between the top foil 93 and the rotating shaft 220 when the rotating shaft 220 rotates, and a porous foil 95 made of a porous elastic material. The backup bearing 90 is disposed near the rotating shaft 220 to back up the rotating shaft, thereby preventing the contact or collision between the rotating shaft 220 and the shaft support 40. For example, the backup bearing 90 may be connected to a connecting piece 49 of the shaft support 40 by a bolt 160.

Additionally, a dielectric 49*a* is filled between the poles 43*a*, and the connecting piece 49 is installed in the dielectric 49*a*.

In the present disclosure, the shaft support is spaced apart a predetermined distance from the outer circumference of the rotating shaft and supports the rotating shaft using the magnetic force, thereby allowing safe operation during high speed rotation of the rotating shaft.

In the present disclosure, the control unit adjusts the intensity of the current applied to the coil and the feed distance of the linear stage, thereby uniformly maintaining the distance between the plasma torch and the metal beam.

In the present disclosure, two ends of the metal beam are supported by the bearing, and it is possible to spray the metal beam in a considerable amount using the plasma torch, thereby improving productivity and stability.

Additionally, in the present disclosure, the shaft support is spaced apart a predetermined distance from the outer circumference of the rotating shaft and supports the rotating shaft using the magnetic force, thereby allowing automatic feeding.

The metal powder manufacturing apparatus 100, 200 for a metal 3D printer as described hereinabove is not limited to the configuration and method of the embodiments described above, and some or all the embodiments may be selectively combined to make various modification.

It is obvious to those skilled in the art that the present disclosure may be embodied in other particular forms without departing from the spirit and essential features of the present disclosure. Therefore, the detailed description should not be interpreted as being limiting in all aspects and should be considered as being exemplary. The scope of the present disclosure should be determined by the reasonable interpretation of the appended claims, and the scope of the present disclosure covers all modifications within the equivalent scope of the present disclosure.

DETAILED DESCRIPTION OF MAIN ELEMENTS

100, 200: Metal powder manufacturing apparatus for a metal 3D printer
5: Plasma torch
7: Vacuum chamber
7*a*: Vacuum area
10: Driving unit
13: Driving shaft
15: Support end
17: Ball bearing
220: Rotating shaft
30, 230: Metal beam
40: Shaft support
41: Housing
43: Core
43*a*: Pole
45: Coil
47: Power supplier
48: Location sensor
50: Flexible connecting element
55: Self-aligning bearing
60: Linear stage
70: Control unit
80: Active control seal

What is claimed is:

1. A metal powder manufacturing apparatus for a metal 3-dimensional (3D) printer, comprising:
  a driving unit which generates a rotational force;
  a metal beam connected to the driving unit to receive the rotational force from the driving unit and having one end disposed in a vacuum chamber;
  a shaft support which supports an outer circumference of the metal beam using a magnetic force for relative movement of the metal beam in a lengthwise direction of the metal beam; and
  a backup bearing installed at an inner side of the shaft support,
  wherein the backup bearing comprises:
  a top foil which forms an air gap between the top foil and the metal beam when the metal beam rotates; and
  a porous foil connected to the top foil and made of a porous elastic material, and
  wherein the shaft support is disposed such that the inner side is spaced apart a predetermined distance from the outer circumference of the metal beam, and can support the metal beam at an adjusted relative distance from the metal beam.

2. The metal powder manufacturing apparatus for a metal 3D printer according to claim 1, wherein the shaft support comprises:
  a housing which forms an external shape and has a receiving portion formed at an inner side;
  a core installed in the receiving portion such that the core is disposed on the outer circumference of the metal beam, and having a plurality of poles projected along a circumferential direction; and
  a coil wound on the poles to form an electromagnetic force in the poles by application of an electric current.

3. The metal powder manufacturing apparatus for a metal 3D printer according to claim 2, wherein one end of the pole is spaced apart from the outer circumference of the metal beam.

4. The metal powder manufacturing apparatus for a metal 3D printer according to claim 1, wherein the driving unit has a driving shaft which rotates by the generated rotational force and is connected to an end of the metal beam, and
  the metal powder manufacturing apparatus for a metal 3D printer further comprises a flexible connecting element connecting an end of the driving shaft and an end of the metal beam to reduce eccentricity between the driving shaft and the metal beam.

5. The metal powder manufacturing apparatus for a metal 3D printer according to claim 1, wherein the shaft support is fixedly installed at a bottom near the vacuum chamber.

6. The metal powder manufacturing apparatus for a metal 3D printer according to claim 1, further comprising:
  a linear stage which feeds to move the driving unit.

7. The metal powder manufacturing apparatus for a metal 3D printer according to claim 2, further comprising:
  a linear stage which feeds to move the driving unit; and
  a control unit electrically connected to the shaft support and the linear stage to control an intensity of the current applied to the coil and a feed distance of the linear stage.

8. The metal powder manufacturing apparatus for a metal 3D printer according to claim 7,
  wherein the control unit adjusts stiffness of the shaft support by controlling the intensity of the current applied to the coil based on a distance between the metal beam and the shaft support.

9. The metal powder manufacturing apparatus for a metal 3D printer according to claim 7, wherein the control unit calculates a distance of consumption of the metal beam based on a distance between the metal beam and the shaft support and an input current value applied to the coil, and moves the linear stage as much as the distance of consumption of the metal beam.

10. The metal powder manufacturing apparatus for a metal 3D printer according to claim 1, wherein the metal beam is a strong magnetic material.

* * * * *